Jan. 12, 1960     P. GRAHAM     2,920,475
BUILDING PANEL Original Filed Oct. 18, 1947     6 Sheets-Sheet 1

Inventor
PHILLIP GRAHAM
By William J. Ruano
Attorney

Jan. 12, 1960

P. GRAHAM

2,920,475

BUILDING PANEL

Original Filed Oct. 18, 1947

Inventor
PHILLIP GRAHAM
By
*William J. Ruano*
Attorney

Jan. 12, 1960 P. GRAHAM 2,920,475
BUILDING PANEL
Original Filed Oct. 18, 1947 6 Sheets-Sheet 4

Inventor
PHILLIP GRAHAM
By William J. Ruano
Attorney

Jan. 12, 1960

P. GRAHAM 2,920,475

BUILDING PANEL

Original Filed Oct. 18, 1947

Inventor
PHILLIP GRAHAM
By William J. Ruano
Attorney

Jan. 12, 1960  P. GRAHAM  2,920,475
BUILDING PANEL
Original Filed Oct. 18, 1947  6 Sheets-Sheet 6

Inventor
PHILLIP GRAHAM
By
Attorney

United States Patent Office 2,920,475
Patented Jan. 12, 1960

2,920,475

BUILDING PANEL

Phillip Graham, Pittsburgh, Pa.

Original application October 18, 1947, Serial No. 780,724. Divided and this application May 5, 1954, Serial No. 427,708

1 Claim. (Cl. 72—40)

The present invention relates to reinforced concrete panels or sections which can be readily interlocked together to obtain a continuously reinforced wall structure or the like, and relates to a method and apparatus for casting such sections. The present application is a division of my copending application Serial No. 780,724 filed October 18, 1947 on Building Construction and now abandoned.

An outstanding disadvantage of most building units, such as bricks, concrete blocks, stones and the like, is that much time and skill are required for lining up such units and laying them. Furthermore, when concrete blocks are employed for building a complete wall, and laid in the ordinary way, such blocks must be of substantial width to obtain the required wall strength and to prevent toppling over. Moreover, due to the relatively poor heat conductivity of concrete, solid concrete walls of substantial width have temperature differentials developed therein due to change in weather, that is differences in external and internal temperatures of the wall, causing considerable internal or locked up stresses which result in cracking. Moisture, upon entering the cracks, causes rapid deterioration, particularly upon freezing of the moisture, which results in disintegration of the block.

An object of the present invention is to provide a construction unit in the form of a reinforced concrete panel or section having fastening means extending from the edges thereof to enable fastening together in exact alignment of adjoining, similar sections, for building up a wall, floor, roof of a dwelling, building or the like, very quickly and inexpensively. The section may be reinforced by metal rods or bars, or by wire mesh or other metallic reinforcing means extending therethrough, and the sections may be made comparatively narrow in width compared to ordinary concrete blocks, consequently reducing uneven expansion or locked up stresses due to temperature differences between the inside and outside thereof due to weather changes, therefore minimizing cracking or disintegration of the section by exposure to different weather conditions. Furthermore, the reinforced concrete section embodying the present invention has a neat smooth finish on both sides, hence does not require stucco, plaster or other veneers. Both inner and outer surfaces may be finished with paint or waterproofed compounds, if desired. The reinforced concrete section may also be built up in the form of a double wall or roof between which air or insulation, such as aerated glass, hard rubber, plastic, etc., or aluminum foil or other well known insulating material may be placed in cases where a thicker structure and a more insulated wall construction is desired. For double walls or roofs, the outside section may be in the form of dense, strong, waterproof concrete and the inner section may be cinder, concrete or the like, which is not dense, but is a better thermal and sound insulator. Thick wall and roof slabs may have a core of insulation, such as aerated glass, cast inside the section. This would be especially suitable when two sets of reinforcing are used, one near each side of the section.

A further object of the present invention is to provide a reinforced concrete panel or section which is curved so as to make it useful for building a serpentine or semi-circular wall construction in order to give greater strength for a given weight and size of concrete section. Curved walls can be made to move and bend slightly to allow for expansion and contraction fluctuations, such wall construction will readily bend to take up for lateral expansion, and the roof or upper part of the structure lifts as the result of vertical expansion.

Thin reinforced concrete sections embodying the present invention, either of straight or curved construction, are particularly suitable for building dwellings in resorts in semi-tropical and tropical climates where temperature fluctuations are not wide, therefore where little expansion or contraction of the concrete takes place and where frost is unlikely. However, such structure, particularly the curved sections and double walls, are also suitable in colder climates, particularly when it is remembered that, according to some authorities, only about 20% of the heat loss of a house is through the walls, most of it being through the windows and roof, hence the use of a thinner concrete wall structure is entirely feasible. Concrete wall siding about two inches thick is used extensively in mill building construction in the northern part of the United States, especially in automobile factories.

The concrete sections involving the principles of the present invention are reinforced with rods or wire mesh, which reinforcement is connected to male and female connectors which project from the edges of the concrete sections so that adjoining sections may be rigidly secured together merely by bringing together such male and female connectors and inserting a bolt therebetween, and afterwards, if desired, filling the void spaces formed between adjoining sections by grout, mastic compound or the like. The male connector is in the form of an eye-bar and the female connector is in the form of a clevis, which connectors are threaded to, welded or otherwise secured to an extremity of the reinforcement. The invention also contemplates a form suitable for casting such reinforced concrete section and for accurately positioning the clevis and eyebars projecting outwardly therefrom along the edges of the sections. The reinforced sections have a wide variety of uses, such as for walls, roofs, floors and the like.

The construction of a dwelling and the like employing concrete sections according to the present invention can be done in freezing or rainy weather, whereas other types of masonry work must be halted. The spaces between the concrete sections may be grouted after erection when the weather permits. When the concrete sections are not cast at the site of the structure which is being erected but are hauled from elsewhere, very little noise accompanies the erection of such sections. Such silent construction work is highly desirable in many communities, such as resort and health centers. In many Florida cities, construction work is not allowed during the winter season because of the possible noise of construction work. Furthermore, the present reinforced sections are adaptable for erecting homes and buildings embodying modernistic architecture. Structures made from reinforced concrete sections embodying my invention are strong, durable, waterproof, neat appearing and inexpensive, and are adaptable for constructing bins, silos, large drainage pipes, water well linings, fences, walls, concrete ship and barge buildings and the like. Buildings of this type of construction are highly resistant to fire, wind, hurricanes, tidal and fresh water floods, explosions (including atomic bomb explosions), earthquakes, structural failure from uneven settling of filled in or poor bearing soil under its foundation, also resistant to entry and/or damage by insects (such as ants, roaches and mosquitoes), rodents, snakes and vandals. This type construction is also resistant to rain, moisture, heat, frost and the like. Thus, structures embodying my invention have very low upkeep and buildings could be easily kept clean, thereby contributing to the health of the occupants. Furthermore, such buildings may be easily and quickly constructed, even by unskilled labor.

Other objects and advantages of the present invention will become apparent from a study of the accompanying drawings wherein:

Fig. 28a is a cross sectional view taken along line 28a—28a of Fig. 27a;

Figure 1:
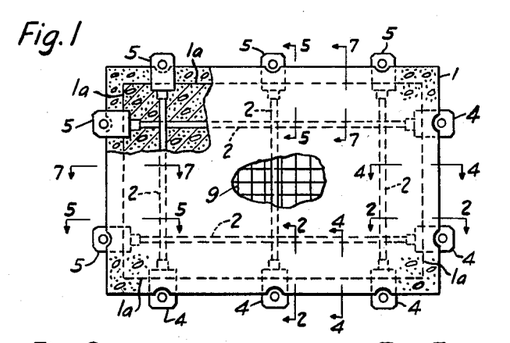
Fig. 1 is a plan view of a cast reinforced concrete section with parts broken away and involving the principles of my invention.
Figure 2:
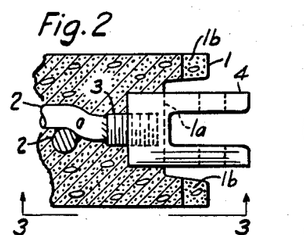
Fig. 2 is an enlarged, fragmentary cross sectional view adjacent one of the female connecting members of the reinforced concrete section shown in Fig. 1 and taken along line 2—2 of Fig. 1.
Figure 3:
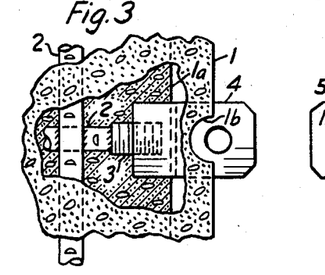
Fig. 3 is a fragmentary view with parts broken away and taken along line 3—3 of Fig. 2.
Figure 4:
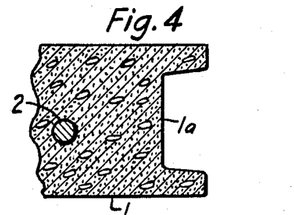
Fig. 4 is an enlarged fragmentary cross sectional view taken along line 4—4 of Fig. 1.
Figures 5, 8:
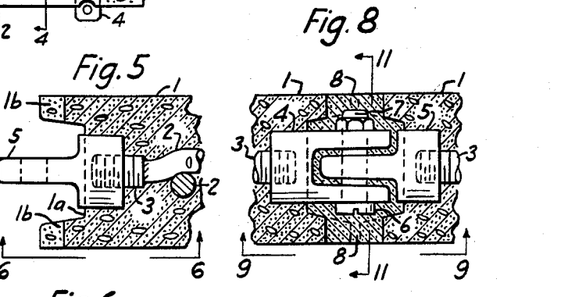
Fig. 5 is an enlarged, fragmentary cross sectional view of one of the male connecting members taken along line 5—5 of the reinforced concrete section shown in Fig. 1.
Fig. 8 is an enlarged, fragmentary cross sectional view taken adjacent the male and female members of adjoining reinforced concrete sections of the type shown in Fig. 1 showing these members securely fastened together.
Figure 6:
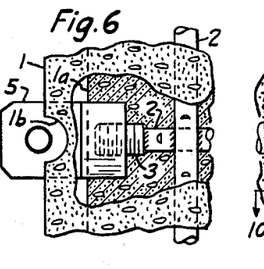
Fig. 6 is a fragmentary view with parts broken away and taken along line 6—6 of Fig. 5.
Figure 7:
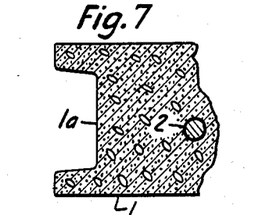
Fig. 7 is an enlarged fragmentary cross sectional view taken along line 7—7 of Fig. 1.

Referring more particularly to Fig. 1 which is a plan view of a precast reinforced section or panel embodying my invention numeral 1 denotes a mass of concrete which has metal reinforcing elements or rods 2 extending longitudinally through substantially the medial plane of the concrete section. Reinforcing elements 2 may be reinforcing bars or rods which may or may not be welded together to form a grid or the rods may be of such small diameter as to form a mesh. Threaded studs 3 are welded to the ends of reinforcing elements or rods 2. A clevis 4 is screwed onto stud 3 of each rod to provide female connectors which extend from a vertical and horizontal edge of each section. Eyebar 5 is a screwed onto stud 3 of each rod to provide male connectors which extend from the other vertical and horizontal edges of the panel. Fig. 2 and Fig. 3 show different views of clevis 4 taken 90° apart. Fig. 5 and Fig. 6 show different views of eyebar 5 taken 90° apart.

When several panels or sections such as that shown in Fig. 1 are erected in the field they must be slid or guided into place so that clevises 4 of one section engage the eyebars 5 of the adjoining section. A perimetrical groove 1a extending along the four edges of each panel clears clevises 4 or eyebars 5 to allow the panels to be placed into position. For example, if one panel is to be erected after panels to adjoin the bottom and side have been erected, it is lowered so that clevises 4 and eyebars 5 thereof slide in grooves 1a of the erected sections.

When sections or panels are erected or placed in adjoining relationship bolts 6 are inserted into the holes in devices 4 and eyebars 5, thus connecting them and in this manner firmly securing adjoining panels together in edge-to-edge relationship. Nut 7 is screwed onto bolt 6 of each pair of connectors. If desired, nut 7 may be omitted since bolts 6 are afterwards grouted in so that they cannot work out of the hole. As employed in highly stressed structural steel work, temporary bolts or wedges, such as drift pins, may be used initially and afterwards replaced by finished bolts 6. When a panel is held by temporary bolts or wedges, such bolts or wedges need be applied only to some and not all of the connections 4—5—6. A reamer is run through the unfilled holes. Tight fitting bolts 6 and nuts 7 are then assembled. The temporary bolts or wedges are then removed and, after reaming, bolts 6 and nuts 7 are assembled. The tight fitting bolts in the reamed holes make a strong connection.

Figure 9:
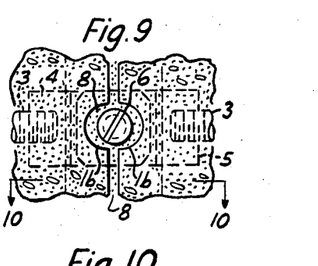
Fig. 9 is a fragmentary exterior view of the joint of Fig. 8 taken along line 9—9 of Fig. 8.
Figure 10:
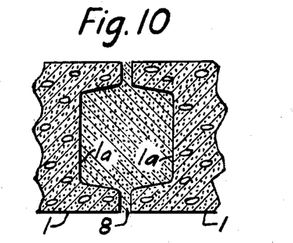
Fig. 10 is a cross sectional view taken along line 10—10 of Fig. 9.
Figure 11:
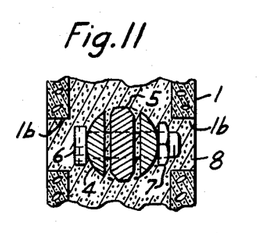
Fig. 11 is a cross sectional view taken along line 11—11 of Fig. 8.

When low stressed connections are adequate, wedges or rough bolts can be used. The shank of the rough bolt may be tapered to act as a wedge to prevent play and for easier insertion into the clevis and eyebar holes. Semi-circular recesses 1b are cast into the edges of the panel or section to allow introduction of the temporary bolts, wedges, reamers, bolt 6, nut 7 and grout 8 between adjoining sections. After all connections have been made, cement grout 8 may be forced through the circular holes made by the two adjoining and confronting semi-circular holes 1b, thus permitting filling up of the seams and cavities or grooves 1a. Cement grout 8 when hardened or cured sets to key adjoining sections together as shown in Figs. 8, 9 and 10. Grout 8 seals all the reinforcing elements 2 against corrosive or oxidizing action of the weather.

The above described sections can be used for temporary walls, and the like under low stress conditions. For temporary work, grouting may be omitted, except that the small seams and semi-circular holes 1b are preferally sealed up with cement or plaster thereby leaving unfilled the cavity formed by the grooves 1a. Temporary office and factory partitions may be made in the above described manner.

Since much of the reinforcement in concrete is used to reduce the size of cracks, the smaller the cracks, the slower the deterioration of the concrete. When conditions justify its use, additional reinforcing means 9, in the form of a small sized wire mesh, can be added to further strengthen the structural panel. Mesh 9 may be fastened to reinforcing elements or rods 2 with wire clips or welds while reinforcing rods 2 are stretched in place in a form which will be described hereinafter.

The connection between the male and female connectors is made up of parts 4, 5, 6 and 7. Laterally extending mesh 13a and 13b may be cast in the concrete mass of the section to provide additional reinforcement to the corners of the section having small cross-section. Reinforced concrete sections of almost any shape or size irrespective of sharp or thin edges may be cast with this type of reinforcement.

Figure 12:
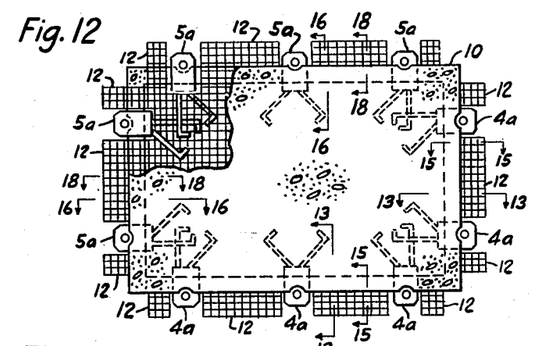
Fig. 12 is a plan view of a modified form of a cast reinforced concrete section involving my invention with parts shown broken away and wherein wire mesh is used instead of rods or bars for reinforcement.
Figure 13:
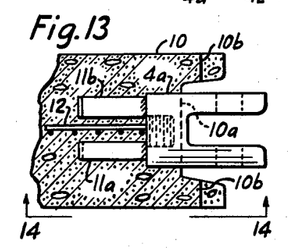
Fig. 13 is an enlarged, fragmentary cross sectional view adjacent one of the female connecting members taken along line 13—13 of the reinforced concrete section shown in Fig. 12.
Figure 14:
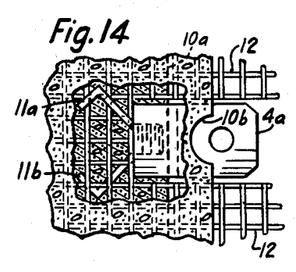
Fig. 14 is a fragmentary view with parts shown broken away taken along line 14—14 of Fig. 13.
Figure 17:
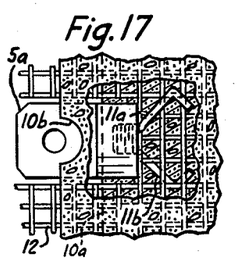
Fig. 17 is a fragmentary plan view with parts shown broken away and taken along line 17—17 of Fig. 16.
Figure 18:
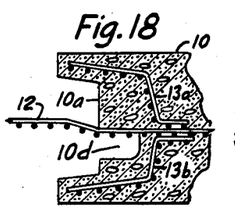
Fig. 18 is an enlarged fragmentary cross sectional view taken along line 18—18 of Fig. 12.
Figure 19:
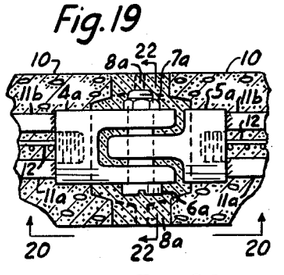
Fig. 19 is an enlarged, fragmentary cross sectional view taken adjacent the male and female connecting members of reinforced concrete sections of the type shown in Fig. 12.
Figure 20:
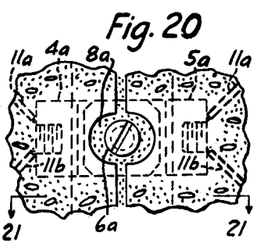
Fig. 20 is a fragmentary exterior view of the joint of Fig. 19 taken along line 20—20 of Fig. 19.
Figure 21:
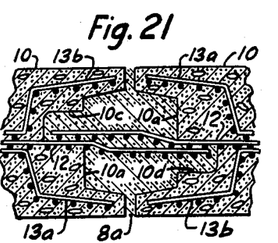
Fig. 21 is a fragmentary cross sectional view taken along line 21—21 of Fig. 20 through the connecting members of adjoining sections of the type shown in Fig. 12.
Figure 22:
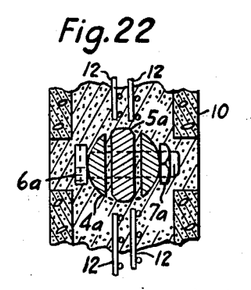
Fig. 22 is a cross sectional view taken along line 22—22 of Fig. 19.

Fig. 12 shows a modified form of precast reinforced section employing a wire mesh reinforcement. It may be of the same size as the section shown in Fig. 1 and it may be cast from the same form for making the section of Fig. 1. The section in Fig. 12 is made up of concrete 10 which is similar to concrete 1 of Fig. 1. Clevis 4a is similar to 4 of Fig. 1 and eyebar 5a is similar to 5. Anchor bars 11a and 11b (see Fig. 14) are welded to clevis 4a and eyebar 5a. Anchor bars 11a and 11b may be welded to a bolt and this bolt may be threaded into tapped holes in clevis 4a or eyebar 5a. Anchor bars 11a and 11b may be combined into the form of one bent bar with a hole in it through which a bolt is insertable to connect it to a tapped hole in clevis 4a or eyebar 5a. Anchor bars 11a and 11b can be bent from the positions shown in Fig. 14 and Fig. 17, to those shown near the corners of Fig. 12, thus keeping the bars 11a and 11b away from the corners where they would do little good and perhaps some harm. Where low stressed, cheap construction is adequate, anchors 11a and 11b may constitute all the reinforcement required. Grooves 10a are similar to grooves 1a of Fig. 1. Semi-circular holes 10b are identical to 1b. Grooves or recesses 10c and 10d are readily formed during casting by rolling the ends of mesh 12 around a stick 30 (see Fig. 29) with oiled paper 29 outside. Reinforcing mesh 12 is the principal reinforcing means in the section. Mesh 12 is fastened to bars 11a and 11b by wire clips or welds. Mesh 12 may be welded to clevises 4a and eyebars 5a. Bars 11a and 11b can be eliminated in the case of low stressed sections. Mesh 12 is preferably notched at the corners and at the positions of clevises 4a and eyebars 5a. The ends of mesh 12 are pulled out of grooves 10c and 10d after casting and roughly straightened. Laterally extending pieces of mesh 13a and 13b are fastened to bars 11a, 11b or mesh 12 with wire clips or welds before casting. Mesh 13a and 13b reinforce thin edges of the concrete section 10 which are otherwise apt to be damaged in handling before erection. Erection of the sections of Fig. 12 is the same as those of Fig. 1. Overlapping of the ends of the mesh 12 of adjoining sections in the grooves formed therebetween creates additional reinforcement particularly after grout 8a is hardened or cured. The connection between adjacent sections is made up of parts 4a, 5a, 6a and 7a.

Figures 23, 24, 26:
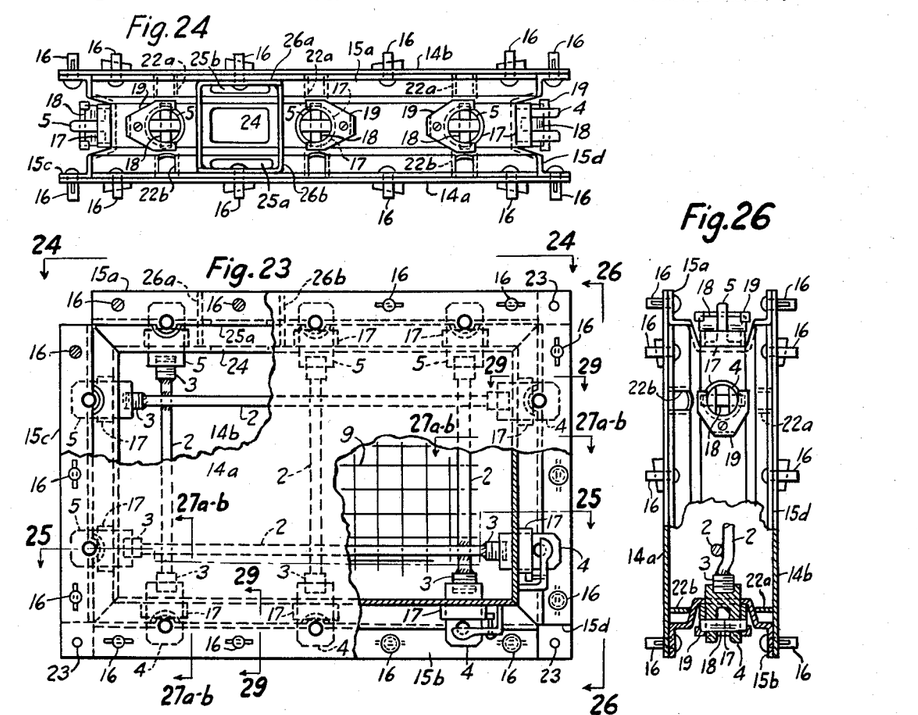
Fig. 23 is an elevation of a form for casting a reinforced concrete section involving the principles of my invention wherein the cast concrete section is shown therein and wherein parts of the form and section are shown broken away.
Fig. 24 is a top view of the form shown in Fig. 23.
Fig. 26 is an end view of the form shown in Fig. 23.
Figure 25:
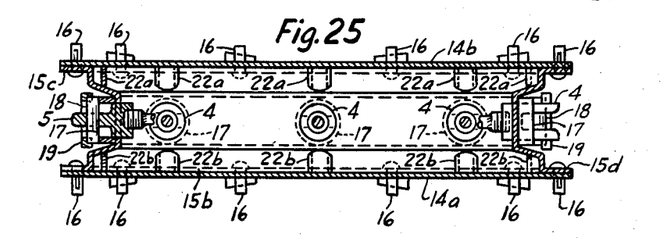
Fig. 25 is a sectional view of the form taken along line 25—25 of Fig. 23.
Figure 35:
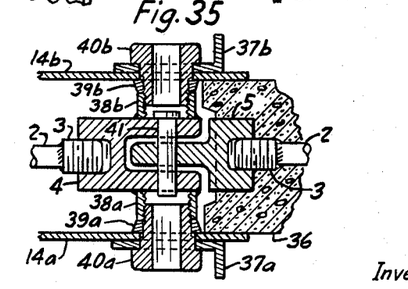
Fig. 35 is a fragmentary cross sectional view showing the form being used to cast concrete in place.

Figs. 23 to 26 show a form for casting concrete sections such as shown in Fig. 1 or 12. The form may be made of metal, plastic sheets, plywood, or other suitable material. Steel forms would probably be most economical. In Fig. 23 the form is shown with reinforcing units attached or strung for casting a section therearound. The form could be used to cast either type of section, that of Fig. 1 or Fig. 12, building site or in a factory. If the casting is done at the factory, the forms are stripped and the casting hauled to the building site. The transportation costs, cost of labor etc. would determine the most economical location for casting. The form may be used to cast concrete in place, at the building site as shown in Fig. 35, which will be explained later. Forms for casting reinforced concrete sections of almost any structural shape may employ the reinforcing system shown in Figs. 23 to 26.

The form shown in Figs. 23 to 26 has side plates 14a and 14b and four edge plates, 15a on top, 15b on the bottom, 15c and 15d at the ends. Wedge bolts 16 are used to fasten the plates together. Edge plates 15a, 15b, 15c and 15d are dished inwardly to form or mold groove 1a on the perimeter of the section. The edge plates are flanged and holes are made in the flanges to register with the holes in the side plates 14a and 14b. Wedge bolts 16 are inserted into these registering holes to fasten the plates together. The ends of the edge plates are mitered for close fit with adjoining edge plates. The edge plates have holes to receive clevises 4 and eyebars 5. These holes are slightly larger than clevises 4 or eyebars 5 and are spaced at a predetermined distance apart depending upon the reinforcing means used and the nature of the adjoining concrete sections. A tubular sleeve 17 is welded to the edge plates at each hole for encircling clevis 4 and eyebar 5. The sleeve 17 makes a close fit to clevis 4 and eyebar 5.

When assembling the form of Fig. 23 for casting, either plate 14a or 14b is fastened to the edge plates 15a, 15b, 15c and 15d in the manner described above. Then the reinforcing rods 2 are placed by threading clevises 4 or eyebars 5 to studs 3, assuming that studs 3 have been previously welded to rods 2. Clevises 4 and eyebars 5 are inserted from the outside to engage rods 2. A temporary pin 18 is inserted into each hole in clevis 4 or eyebar 5 to prevent the clevis or eyebar from pulling or falling through sleeve 17 and edge plate. The reinforcing rods 2 are tensioned or pulled up by turning clevis 4 and eyebar 5. This is conveniently done by means of a gripping pin (see also Figs. 27a and 28a) 18 which is turned with a lever-like tool, thereby turning clevis 4 and eyebar 5. Mesh 9 is then fastened to reinforcing rods 2. The other side plate, either 14a or 14b, is then placed and fastened with wedge bolts 16. Clevis 4 and eyebar 5 are screwed or tightened so that the temporary pin 18 is perpendicular or at right angles to side plates 14a and 14b. A horseshoe-shaped clamp 19 holds pin 18 to prevent it from falling out of clevis 4 and eyebar 5, it prevents outward movement thereof in case the reinforcing rods loosen up slightly. Clamp 19 is fastened to the nut or tapped lug 20 with machine screw 21 (see Fig. 28a), lug 20 being welded to sleeve 17 beforehand. Lug 20 is located exactly at right angles to the final position of temporary pin 18. Bent plates or half or semi-circular pieces of pipe 22a and 22b, previously welded to edge plates 15a, 15b, 15c and 15d before assembly, form the semi-circular holes 1b. Holes 23 at the four corners of plates 14a and 14b may be used for fastening lifting connections from cranes or the like or for making connections to vibrators or other machinery. Large opening 24 (see Fig. 24) in plate 15a and small openings 25a and 25b in plate 15a are pouring holes for concrete. Through these openings, vibrators could be inserted into fresh concrete. Pouring baffle plates 26a and 26b are tack welded together and they may be tack welded to plate 15a. Baffle plates 26a and 26b are connected to plate 15a and side plates 14a and 14b by means of bolts 16. Holes 27 in plate 14a are used to withdraw temporary pins 18 therethrough when stripping the form. Plate 14b does not require holes 27 but it does no harm to put the holes therein so as to make the plates interchangeable. Also if the form is to be used to cast concrete in place, at the building site the hole 27 would be needed in plate 14b as shown in Fig. 35. Holes 28 in edge plates 15a, 15b, 15c, and 15d are provided for removing temporary pins 18 when stripping the forms.

Figure 27A:
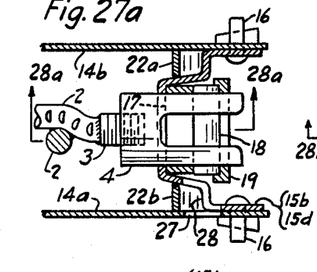
Fig. 27a is an enlarged cross sectional view taken along line 27a—27a of Fig. 23.
Figure 27B:
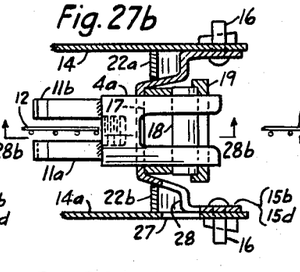
Fig. 27b is an enlarged cross sectional view of a modified form of connection as compared to that shown in Fig. 27a and taken along line 27b—27b of Fig. 23.
Figure 28A:
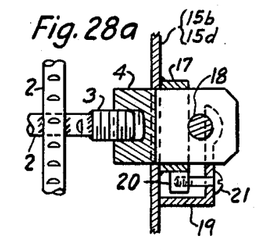
Figure 28B:
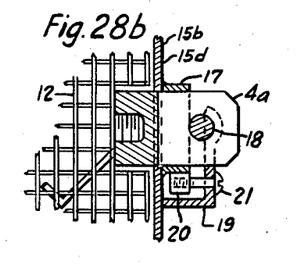
Fig. 28b is a cross sectional view taken along line 28b—28b of Fig. 27b.

The form is set up so that sides 14a and 14b are vertical. When concrete is poured and vibrated a dense concrete is formed. As the form fills up air bubbles and voids are broken up by the vibrating action. Any shrinkage of the concrete after pouring has been discontinued would only cut down the edge distance of the top of the section thus making a slightly larger gap at erection between this edge and the edge of the adjoining section. This gap can be filled up with grout after the section is set up or erected. The form may be tilted to reduce the tendency of the voids to remain along the entire breadth of the top. When the form is used to cast a concrete section such as shown in Fig. 12, a similar procedure is followed as that for casting the section shown in Fig. 1. The main difference is that mesh 12 and pieces of mesh 13a and 13b are fastened with wire clips or welded to parts 11a, 11b, 4a and 5a. Parts 4a and 5a are fastened in the same way, but are not turned to tighten the reinforcing mesh. Reinforcing mesh 12 is stretched when fastened. Fig. 27b is similar to Fig. 27a, and Fig. 28b is similar to Fig. 28a, but shows wire mesh instead of rods for reinforcement.

Figure 15:
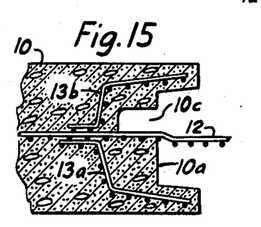
Fig. 15 is a fragmentary cross sectional view taken along line 15—15 of Fig. 12.
Figure 16:
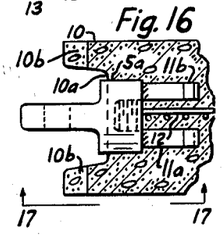
Fig. 16 is an enlarged, fragmentary cross sectional view taken along line 16—16 of Fig. 12 adjacent one of the male connecting members.
Figure 29:
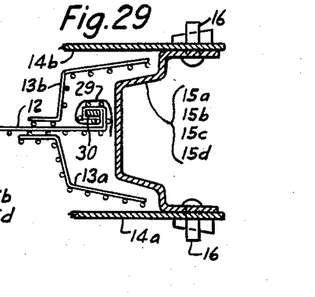
Fig. 29 is a cross sectional view taken along line 29—29 of Fig. 23.
Figure 30:
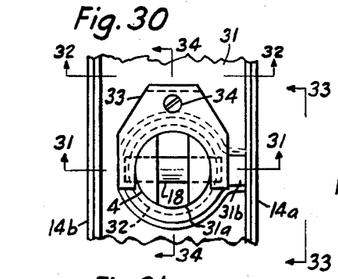
Fig. 30 is a fragmentary plan view of a modified form of outlet in the form for leading in the connector member in the case of curved and end edges.
Figure 31:
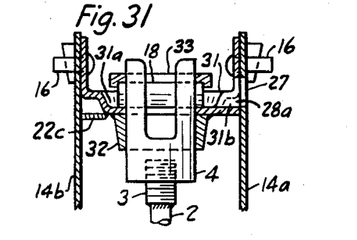
Fig. 31 is a fragmentary cross sectional view taken along line 31—31 of Fig. 30.
Figure 32:
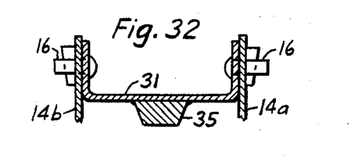
Fig. 32 is a fragmentary cross sectional view taken along line 32—32 of Fig. 30.
Figure 33:
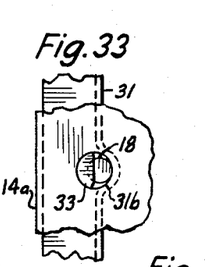
Fig. 33 is a fragmentary view taken along line 33—33 of Fig. 30.
Figure 34:
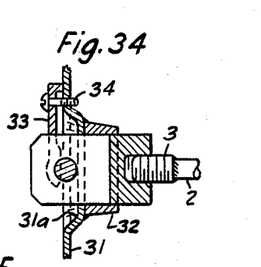
Fig. 34 is a fragmentary cross sectional view taken along line 34—34 of Fig. 30.

Fig. 29 shows reinforcing mesh 12, 13a and 13b in relation to the form before concrete is poured. A piece of oiled paper 29 is glued or fastened to bar 30 which may be of wood or metal. The end of mesh 12 is wrapped around bar 30 along with paper 29 until the part of mesh 12 which projects outside of the cast concrete, is wrapped. The oiled paper 29 is on the outside. When concrete is poured, a little of it may seep in between the layers of paper and mesh, but concrete does not adhere to oiled surfaces. When the form is stripped, the oiled paper and mesh can readily be pried out, then any adhering bits of concrete can easily be broken loose. Fig. 15 shows a view of a finished section. The oiled paper 29 and bar 30 of any suitable material are afterwards discarded and the mesh 12 straightened. When the form is stripped from the section shown in Fig. 1 or Fig. 12 screw 21 and clamp 19 are removed, then temporary pin 18 is hammered or tapped out through holes 27 and 28. Bolts 16 are removed and all pieces are then pulled away from the concrete section. If the inside surfaces of the form were well oiled before pouring, all parts of the form would break loose with slight hammering. The form shown in Figs. 23 to 26 is being designed to encase either the section shown in Fig. 1 or that shown in Fig. 12. It is obvious that a section of the Fig. 1 type would not be the most economical one to use if an edge were to come at a wall opening, such as doorway, window opening or the top of a parapet wall. The groove or channel 1a, in this case, would have to be filled up with grout, which would be costly and crude. Also clevis 4 or eyebar 5 would have to be removed. For these situations interchangeable edge piece may be used on the form to form a plain end, except for a small amount of grouting at the end of the reinforcing means where clevis 4 or eyebar 5 is removed. Also, when curved forms are made for casting curved concrete sections, to be described hereinafter the curved edge pieces could be made similar to the plain edge pieces at a much lower cost. Fig. 30 is a fragmentary plan view of the top, bottom or end of a form that is used to cast a plain edge or, when bent, to cast a curved edge. Edge plate 31 has holes for clevis 4 or eyebar 5 and these holes 31a are dished or counter sunk from the plane of the remainder of the plate. A lip 31b is pressed in plate 31 to allow the pin 18 to be removed. A hole 28a in plate 31 registers with hole 27 in plate 14a. These holes are used to remove pin 18 when stripping the form. A half pipe 22c is welded to edge plate 31 to form a semi-circular hole such as the 1b in the concrete section. A tubular sleeve 32 which is tapered slightly on the outside is welded to plate 31 below hole 31a. Sleeve 32 keeps parts 4 and 5 in alignment and seals the concrete and prevents leakage past these parts. A horseshoe shaped clamp 33 which is the same as 19, except for a shorter leg, holds pin 18. A machine screw 34 fastens clamp 33 to plate 31. A filler 35 is welded or bolted to plate 31 whenever a groove or notch is required in the concrete section to receive windows, sealing material, conduits, etc. One or more fillers 35 could be used and they may be of any desired shape. When the type edge plate 31 is used to cast curved or straight concrete section edges, fillers 35 can be made to cast grooves similar to 1a. For example, assuming that all wall concrete sections are to be erected by lowering in place. The horizontal edges of these concrete sections may have plain edges except for clevis 4 and eyebar 5 protruding since adjoining horizontal edges are brought into contact with each other without the sliding method which must be used for vertical means. Grout can be placed on the top horizontal edge before placing another section on top of it. The bolts 6 connect clevis 4 and eyebar 5 together. When highly stressed construction is required, horizontal joints should have grooves similar to 1a, but they need not be as large. These grooves can be cast into section by using fillers 35.

It is probable that conditions will arise on construction projects when it would be necessary to cast some concrete sections in place, such conditions as low head room in a building where interior partitions are being built. Since these sections are most economically lowered and slid into adjoining sections, headroom for the section and crane are usually necessary. Another instance would be when a section shows up defects after erection when it is put under stresses and requires replacing. Since it may be locked in on all edges, it must be broken up in place and a new section cast in the same space. A modified form could be used to cast concrete in place.

Fig. 35 is a fragmentary section through such modified form, showing how it may be used to cast concrete in place adjoining an existing section. Concrete section 36 is in place and has eyebar 5, stud 3, etc., imbedded in it. Stiffener angles 37a and 37b are preferably used to stiffen up plates 14a and 14b. Angles 37a and 37b may be tack welded to plates 14a and 14b, respectively. Clevis 4 has nuts 38a and 38b welded to it. Ring-shaped washers 39a and 39b take up the space between nuts 38a and 38b, and plates 14a and 14b. Washers 39a and 39b are tapered on the outside, so they can be easily removed when stripping the form. Hexagonal head sleeve bolts 40a and 40b screw threadedly engage nuts 38a and 38b thus holding side plates 14a and 14b in close contact with the existing wall. Sleeve bolts 40a and 40b have an axial hole through which pin or bolt 41 can be inserted. Bolt 41 can be placed in clevis 4 and eyebar 5 before the form is assembled but in some instances, it would be less costly to assemble all or part of the form before placing it into position. Bolt 41 can then be inserted through the holes in sleeve bolts 40a and 40b. One prong of clevis 4 can be tapped to receive a slotted head machine screw 41, or a nut could be welded outside clevis 4 to receive screw 41. When the form as shown in Fig. 35, is stripped washers 39a and 39b are pried out, nuts 38a and 38b remaining in the concrete since they are welded to clevis 4. The holes are filled with grout. There are no seams, joints or grooves to fill up with grout.

It should be noted that the above described form may be used to construct the entire building, section by section, if desired.

Form parts may be standardized to a great extent and made interchangeable, also lengths of standard part sections may be fastened together to form long sections, or long sections may be cut to suit. A large assembled form may be used to cast small sections by blocking off parts of the form.

Two straight edge plates, such as 15, may be fastened together to replace the single edge plate 15 so that a doubly thick concrete section can be cast with standard parts. Filters may be placed against plates 15 to vary the form. When two straight sections of the same size are to be cast, side plate 14b may be used as a center side plate for both sections so as to complete the form for casting two sections which may be assembled as one, thus eliminating one plate 14b and one-fourth of the wedge bolts 16 and the labor of placing and removing these parts. Standard form parts could be readily cut to suit, with a cutting torch, and the parts may be readily welded together. It may be convenient for some work to tack weld the forms together, thus eliminating bolts and bolt holes.

Large forms for curved concrete sections require much thinner steel side plates than would forms for straight concrete sections of like size, since large straight forms must have thick sides to resist bulging and distortion when being filled with concrete and vibrated, whereas curved forms are strong even when comparatively thin because of the strength of the curved shaped form.

Since fresh concrete in forms can be partially cured or set rapidly by creating a partial vacuum at the openings in the forms, forms can be stripped from concrete a short time after pouring and reused soon, thus making it practical to use expensive steel forms.

Figs. 36 to 52 inclusive show various applications of the concrete sections embodying my invention, and typical details of slight modifications that would be necessary in using the reinforced cast concrete sections to their fullest extent to make them useful for a large number of applications.

Figures 36, 37, 40, 41, 44, 45:
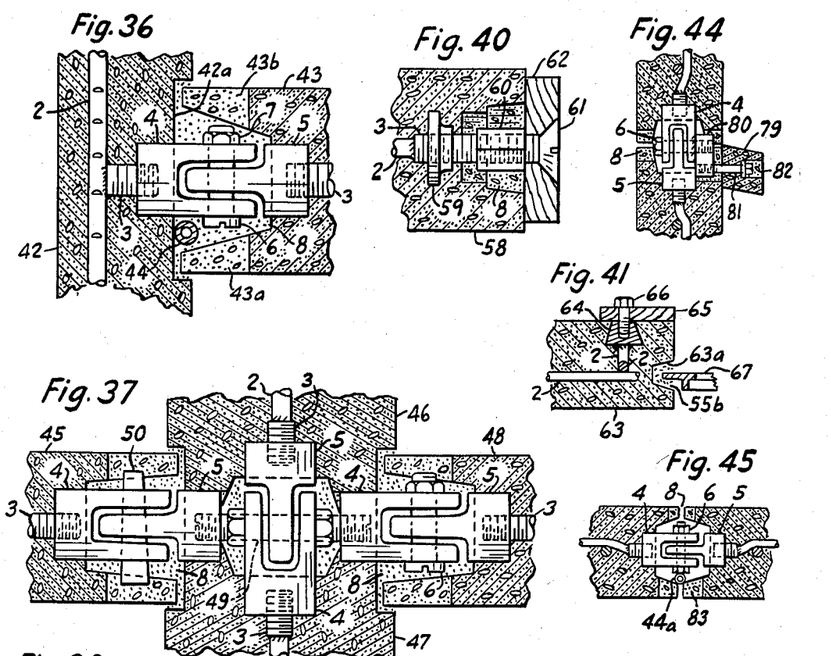
Fig. 36 is a fragmentary cross sectional view showing a joint for holding together two reinforced connecting walls.
Fig. 37 is a fragmentary cross sectional view showing a joint for holding together three reinforced connecting walls.
Fig. 40 is a fragmentary cross sectional view showing an anchor and connection for bolting to a reinforced section.
Fig. 41 is a fragmentary cross sectional view showing a reinforced section used as a window jamb.
Fig. 44 is a fragmentary cross sectional view which shows a connection between a reinforced concrete section and a water table.
Fig. 45 is a fragmentary cross sectional view which shows a recess for an electric outlet box and conduit extending along the joint between adjacent reinforced concrete section.

Fig. 36 shows intersecting walls 42 and 43. The side of the form for casting this section is made similar to that for casting a flat end (Fig. 30). Recess 42a may be molded by tack welding a filler inside the form. Slight changes are made in the form to make wall section 43. Semi-circular holes 43a and 43b are cast into section 43. They allow space to insert bolt 6 and nut 7, also to apply grout 8 to fill the joint, etc. If desired, one or more conduits or utility pipes, such as 44, may be placed in the groove before grouting.

Fig. 37 shows four intersecting concrete sections 45, 46, 47 and 48. They are made and erected similarly to other sections. A stud bolt 49, which has slotted ends and two hexagonal nuts, is used to tie the four sections together. A wedge 50 is employed to tie a low stressed section 45 to others.

Figure 38:
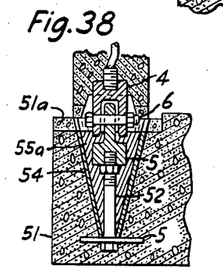
Fig. 38 is a fragmentary cross sectional view showing means for anchorage of a reinforced wall to footer, etc.

Fig. 38 shows a typical detail of a wall section of the type shown in Fig. 1 secured to a footer or floor section 51. Floor section 51 can be cast in a metal form similar to that described hereinabove or by any other well known method. A hexagonal head, anchor bolt 52 engages eyebar 5. A lock nut prevents its loosening. A plate washer 53 prevents bolt 52 from pulling out of the concrete. Floor section 51 has a semi-circular hole 51a cast therein to allow insertion of bolt 6. In order to compensate for slight errors or discrepancies in the vertical or horizontal section, a sheet metal conical sleeve 54 may be placed outside of eyebar 5 and bolt 52 before casting, thus preventing concrete from coming in contact with the shank of bolt 52 or 5 by creating a conical hole in section 51. When the vertical section is erected to horizontal section 51, the top of bolt 52 and eyebar 5 can be moved slightly so eyebar 5 can be lined up with clevis 4. When seams, etc., are grouted, the conical cavity made by sleeve 54 can be filled with grout or mastic compound 55a. It is sometimes desirable to allow some sections or parts of sections to move laterally slightly when expanding or contracting from temperature changes, etc. When that condition exists, the cavity inside 54 should be filled with a mastic compound where lateral movement is required or or with concrete grout where no lateral movement is wanted.

Figure 39:
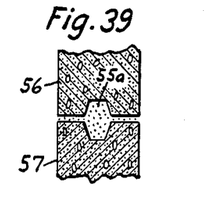
Fig. 39 is a fragmentary cross sectional view through an alternate type of horizontal wall.

Fig. 39 is a typical fragmentary section through a curved wall or a wall made with sections cast with edge plates similar to those shown in Fig. 30. Concrete section 56 is joined to section 57 with typical reinforcing elements. The cross-section of Fig. 39 is taken between the reinforcing units. Filling 55a could be grout or if 57 were a footer similar to footer 51, of Fig. 38, 55a could be a mastic compound to allow section 56 or 57 to move laterally slightly independently of each other.

Fig. 40 is a typical fragmentary section through a wall with a plain end, such as a window or door jamb. The concrete section 58 may be cast by a form similar to that shown in Fig. 30. Concrete section 58 has reinforcing rod 2 with stud 3 welded thereto. An anchor 59 is threaded or welded to stud 3 during the assembly of the form and reinforcement, and it anchors the end of reinforcing rod 2. When the form is stripped, clevis 4 is unscrewed from stud 3 as it was only used to hold the reinforcing rod while making the concrete section. A long nut 60 is threaded to stud 3. The cavities left by the form and clevis 4 are filled with grout 8. Wooden nailing strip 62 is fastened to the concrete reinforcing rod by a flat head machine screw 61 which is threaded into nut 60. If no connection for wood is required, nut 60 and its grout hole may be eliminated.

Fig. 41 shows a typical fragmentary section through a wall at a metal window, the wall including concrete section 63 and reinforcing element or rod 2. The recess groove 63a is for a window. A conventional metal insert 64 may be welded to reinforcing rod 2 or held against the form while casting by making a hole in the form and inserting a cap screw to hold insert 64 or by both a welding and bolting insert 64. Nailing strip 65 is fastened to section 63 with cap screw 66 which is threaded into insert 64. After window 67 is placed, groove 63a is filled with mastic compound or grout 55b.

Figure 42:
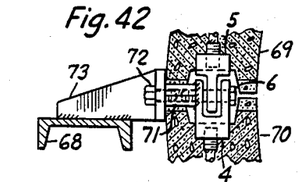
Fig. 42 is a fragmentary cross sectional view which shows a connection between a reinforced section and a girt, purlin or a post.

Fig. 42 is a typical fragmentary section through a straight, curved or serpentine sectionalized concrete unit such as a wall, roof or floor which is supported by structural steel framing.

Steel channel 68 may serve as a girt or post when concrete sections 69 and 70 are being used for walls. Channel 68 may serve as a beam, purlin or a rafter, and sections 69 and 70 as roof or floor slabs. Thin serpentine sections for walls and a roof would be practical structure for widely varying weather conditions since they will allow the concrete sections to bend upon expansion and return to normal position on contraction. If the concrete cracks when expanded, the cracks will disappear when the concrete contracts. Rain, snow, seepage or flood waters cool a serpentine concrete wall, thus causing it to contract and squeeze out most of the moisture from small cracks, thus preventing rapid deterioration by eliminating moisture from the cracks in concrete which would otherwise freeze and damage the concrete. Sections 69 and 70 are shown as curved or serpentine wall sections. They are connected by bolt 6 through clevis 4 and eyebar 5. Channel 68 has a clip angle 73 welded to it. A long nut 71 is welded to clevis 4 before erection has begun. Clip angle 73 is fastened to nut 71 with cap screw 72. Section 70 can be erected and held securely by screw 72 and angle 73 before section 69 is erected. Clip angles 73 can bend due to the gap between channel 68 and section 70 to allow for expansion and contraction of sections 69 and 70 in the direction parallel to the length of channel 68. By turning clip angle 73 90° and welding channel 68 and angle 73 back to back and reversing the direction of the serpentine sections 90°, clip angles 73 can bend to take care of the expansion and contraction movement which is perpendicular to the length of channel 68. Channels 68 can be straight and clip angles 73 varied in length to the varying distance between channel 68 and section 70.

Figure 43:
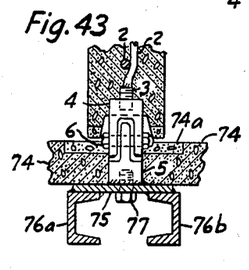
Fig. 43 is a fragmentary cross sectional view which shows a connection between a reinforced section and a beam or a column.

Fig. 43 is a typical fragmentary section through the base, top or end of a wall or slab for a floor or roof. The vertical concrete section is connected to a beam or column which is made up of steel plate 75 which is welded to steel channels 76a and 76b by eyebar 5 and bolt 6. Eyebar 5 is bolted to plate 75 with cap screw 77. To prevent 5 turning, it may be tack welded to plate 75. Eyebar 5 may be welded to plate 75 eliminating bolting, if desirable, but it is often desirable to bolt and adjust the parts before welding. Fireproof concrete 74 around the column or beam 75, 76a, and 76b may be poured before or after fastening the vertical section. Semi-circular hole 74a allows entry of bolt 6.

Fig. 44 is a typical fragmentary section through a wall showing a water table 79 which is made of reinforced concrete. A lug 80 has two tapped holes. Lug 80 may be welded to clevis 4 or eyebolt 5. Bolts 6 and 81 are threaded into lug 80 thus fastening table 79 to the wall. A filler, tack welded to the form before pouring, molds the recess in the section for lug 80. Fresh cement or grout is preferably put in the crack between table 79 and the wall before bolts 81 are tightened. The holes in table 79 are filled up with grout 82. The joint between the upper and lower sections are filled with grout 8. Other concrete sections, such as ornamental strips, etc., may be fastened in a similar manner to table 79.

Fig. 45 is a typical fragmentary section through a wall, floor or ceiling seam or joint showing a conduit 44a and a recess 83 for an electric outlet box. This could be a vertical or horizontal seam. Two concrete sections are fastened together, side by side, by bolt 6 through clevis 4 and eyebar 5. Conduit 44a can be placed after bolt 6 has been inserted. Recess 83 is formed by welding fillers to the forms so as to mold such recess. An outlet box (not shown) is connected to conduit 44a before grout 8 is inserted. Grout 8 anchors the outlet box to the wall and fills up the seam in which conduit 44a is placed. Utility pipes such as those for gas, oil, water and vents can be similarly placed in the recess or groove.

Figure 46:
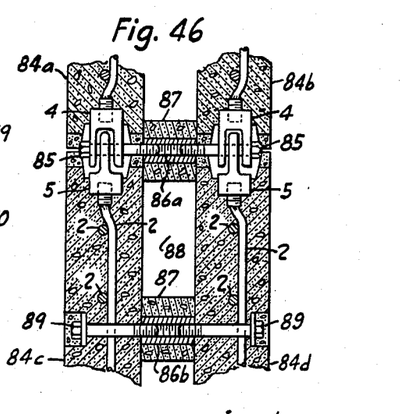
Fig. 46 is a fragmentary cross sectional view of a double wall, roof or floor reinforced section.

Fig. 46 is a typical fragmentary section through a double wall, floor or roof. Concrete sections 84a and 84c are interconnected by bolt 85 through clevis 4 and eyebar 5. Sections 84b and 84d are interconnected by bolt 85 through clevis 4 and eyebar 5. Threaded sleeve 86a is engaged by bolts 85, thus tying sections 84a, 84b, 84c and 84d together. The holes and recess for bolt 89 are cast in sections at predetermined spaces. Bolts 89 engage threads in section 86b and thus tie sections together at intermediate points. Sleeves 86a and 86b have an outer shell of reinforced concrete 87 which is precast on the sleeves before erection. Shells 87 protect sleeves 86a and 86b from corrosion and strengthen them for compressive stresses. All bolt head recesses and seams are preferably grouted. Space 88 between the walls or sections can be filled with insulation or can be left as a dead air space. Or perhaps hot, cold or normal temperature air may be circulated through it. When provisions are made beforehand a single wall, floor, or roof can be erected and the second unit added later. The interior wall, floor or roof of double wall, floor or roof may be perforated for ventilation, air conditioning and hot air heating when space 88 is used as an air duct. Lead sheeting can be placed against the inside surface of the outside wall. The sheeting may be continuous, except for holes for bolts 85 and 89. This lead sheeting together with the concrete would stop some of the harmful rays, such as beta and gamma rays, from an atomic bomb explosion if the explosion were close. Doors and shutters of the building would have to be lead coated also.

Figures 47, 49:
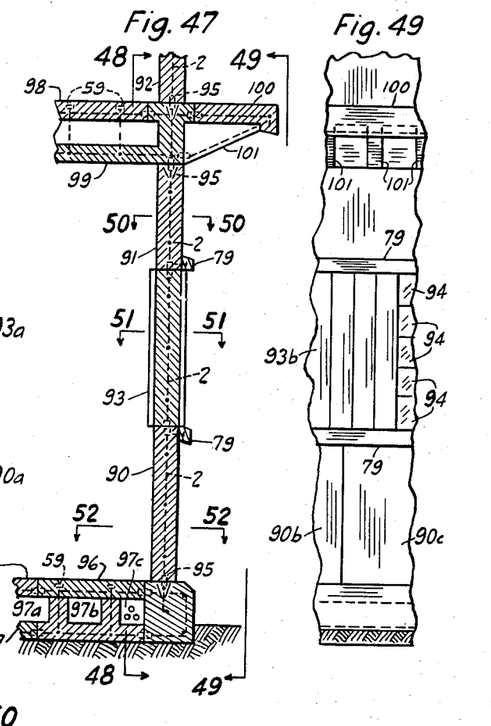
Fig. 47 is a cross sectional elevation through reinforced walls of a building.
Fig. 49 is a cross sectional view taken along line 49—49 of Fig. 47.
Figure 48:
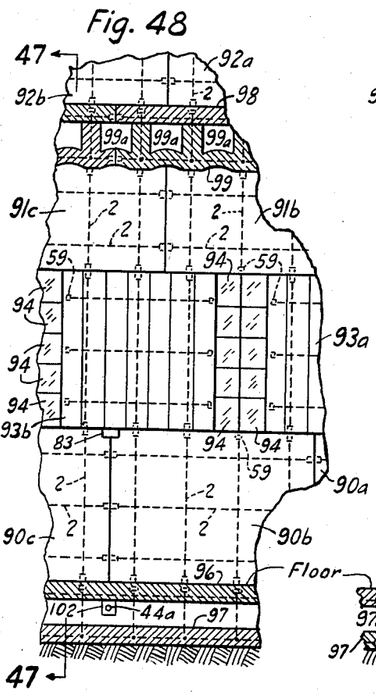
Fig. 48 is a cross sectional view taken along line 48—48 of Fig. 47.

Fig. 47 is a typical fragmentary elevational section through the walls of a small building, such as a residence, in a warm climate. The construction materials are reinforced concrete and glass block for the windows. Since little or no frost is contemplated, footers and foundation are almost dispensed with. Fig. 47 along with other figures further show how reinforced concrete sections according to the present invention can be used for cheap, durable, strong, neat appearing houses. Walls are of serpentine design which are thus very strong and a minimum amount of material is required for such walls. Such design readily lends itself to modernistic type architecture and the construction is highly practical in Florida, Southern California, Gulf Coast and other warm sections of the United States where strong houses are necessary to withstand hurricane winds, earthquakes or tidal floods. Wall sections 90, 91 and 92 are similar in construction to that shown in Fig. 1 except for the fact that they are curved to form a serpentine wall. Sections 92a and 92b are parapet walls. They could be second story walls. Floor sections 96 are connected to base sections 97. Sections 97 are cast to form channel-like troughs 97a and 97b which when capped with sections 96 form spaces that can be used as ducts. The space 97c next to wall can be used as a pipe trench. Small removable access openings and slabs to fit them can be placed where needed. Spaces 97a and 97b can be alternated so that spaces 97a could be used for ventilating and air conditioning, with small vent holes through section 96 above section 97a. Space 97b can be used for circulating warm air for radiant heating through section 96. Heat from space 97b would heat up adjoining walls with space 97a, thus air for ventilation which passes through space 97a would warm up and help to keep the building warm at a lower cost since sections 96 and 97 would remain about the same temperature. If the building is large, expansion joints should be provided, but otherwise the variation in temperature would only change sections 96 and 97 slightly in length and width which would do little or no damage since the whole floor system can expand outwardly as do wide concrete road sections.

Roof sections 98 and 99 are similar to floor sections 96 and 97. The arched bottoms of the duct spaces are curved so they can bend when expanded or contracted. The bottom of duct spaces 99a have small vent holes. Duct spaces 99a are used for ventilating. Exhaust air is drawn off through ducts 99a. Since the roof surface and ceiling surface often vary considerably in temperature, the arched parts of section 99 bend for expansion and contraction. Roof section 98 remains straight. Since the reinforcing element prevents large cracks in the roof sections, waterproofing on the roof can be reduced to a minimum. Reinforced overhanging roof slab 100 is fastened to the roof and wall sections. Brackets 101 help to support slab 100. Overhanging roof slab 100 protects the walls from the heat of the midday sun and keeps most rains off the lower walls and away from the window and door areas.

Figure 50:
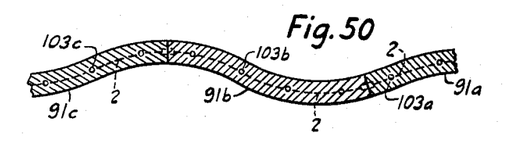
Fig. 50 is a cross sectional view of the serpentine reinforced wall taken along line 50—50 of Fig. 47.
Figure 51:
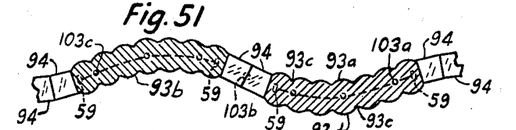
Fig. 51 is a cross sectional view through a modified form of serpentine reinforced wall such as might be taken along line 51—51 of Fig. 47.
Figure 52:
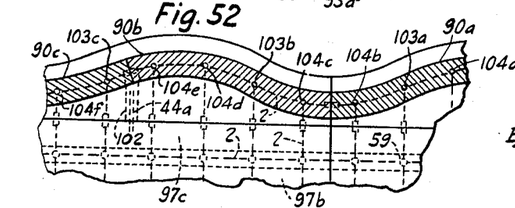
Fig. 52 is a cross sectional view through a further modified form of serpentine reinforced wall showing anchorage means taken along line 52—52 of Fig. 47.

A hole 102 is cast in the footer section for conduit 44a. Figs. 50, 51 and 52 have tangent points 103a, 103b and 103c indicated. In this particular structure, reinforcing means is also shown at these points. In Fig. 52 tangent points 103a, 103b and 103c have anchor bolts 52 (see Fig. 38) grouted solid so that the wall is anchored securely to prevent any lateral or vertical movement. Points 104a, 104b, 104c, 104d, 104e and 104f have anchor bolts 52 with sleeves 54 (see Fig. 38) which are filled with mastic 55a, thus allowing the wall at these points to move laterally, and allowing walls to bend when expanding or contracting. The wall and footer can be constructed between anchors as shown in Fig. 39. Compound 55a should, in this case, be a mastic to seal against weather, etc., and at the same time allow the wall to move and the footer remain stationary or vice versa.

In the structure shown in Fig. 47, points 95 at the floor, ceiling and roof all have the same anchor bolt arrangement to allow the walls to move and bend. When a serpentine wall or curved wall is anchored down, it is able to resist a large horizontal force. It takes a much greater load to overturn a curved wall than it does a straight wall. Floor and roof sections may be provided with a durable insulation, such as aerated glass imbedded or cast into the section. Floor section 96 may have a terrazzo finish added thereto, if desired.

Fig. 51 shows curved sections 93a and 93b between windows 94. These sections have a series of dummy joints 93c cast in the sides. Between dummy joints 93c there are curved bulges 93d. The thinnest section through 93b is at dummy joints 93c. This thin part is shown as being the same thickness as 90c and 91c. The curved bulges 93d increase the strength of the wall section and the dummy joints allow the wall to bend, and if it cracks slightly, it has a tendency to crack at the dummy joints 93. Cracks in joints 93c would be inconspicuous because of the jointed design. Construction joints between adjacent sections blend with the dummy joint design and are likewise inconspicuous. The design pattern of joints 93b is attractive and modern in appearance.

While the reinforced concrete sections embodying my invention have been described as being useful as floor, wall and roof panels in building construction, it should be noted that they also may be used advantageously for building other structures. For example, they may be in the form of arcuate segments for building up a large reinforced concrete pipe which can be assembled in the field and thus eliminate the necessity of hauling a large complete pipe that is often extremely bulky, often one pipe fills a truck and yet weighs only a fraction of the load capacity of the truck. In addition, the high center of gravity of the complete pipe makes it a dangerous load to haul and requires the use of large loading and unloading cranes. The advantages of small segments are rather obvious, being easier to haul and requiring small cranes for handling, and are readily assembled in the field. Also, tank sections, such as water, oil and septic tanks, pipes, beams, columns, guard rails and well linings may be made from such smaller sections. Furthermore, stair sections, such as treads, risers, and springers, as well as retaining wall sections and fence sections may be made up of small sections for low cost construction. Similarly, other large reinforced structures may be built up from the small reinforced sections. While reinforcing elements have been illustrated as extending through substantially the medial plane of the concrete sections, it should be noted that they may extend adjacent either face of the section, particularly in sections used for floors or roofs. For example, in the case of floor slabs, the reinforcing elements extend near the bottom surface so as to reinforce such surface against tensile forces.

Furthermore, instead of employing reinforcing elements in the form of a grid-like network, they may constitute metal rods in parallel relationship extending either horizontally or vertically. Also, instead of using concrete, other materials may be used for the sections or panels, such as fibrous insulating board materials, plastic compositions and other well known wall board materials or cementitous compounds.

Thus it will be seen that I have provided a relatively simple, inexpensive and highly efficient reinforced concrete section or panel which is readily attachable and detachable with similar panels for erecting a wall for a building or a wide variety of other larger structural units, which structures may be readily assembled in exact alignment by unskilled labor in relatively short time, therefore considerably decreasing the cost of building construction or assembly of other structures.

While I have illustrated and described specific embodiments of my invention, it will be understood that these are by way of illustration only, and that various changes and modifications may be made within the contemplation of my invention and within the scope of the following claim.

I claim:

A precast, cementitious building panel of rectangular outline, said panel having its extremities accurately defined to allow similar panels to be joined closely in edge-to-edge relationship, the closeness of the panels providing a narrow mortar joint that can be finished easily, wire mesh fabric embedded in an intermediate major plane of said panel, said panel having a keying groove extending along the entire perimetrical edge and substantially centrally thereof, for receiving mortar grout for keying together similar panels when placed in edge-to-edge relationship, said wire mesh extending beyond all the outer edges of said panel, so that it penetrates the grooves of like adjoining panels, whereby the wire meshes of like adjoining panels will overlap considerably, when said panels are placed in edge-to-edge relationship, to provide continuity of reinforcement through the joints between panels, a plurality of metallic fastening means anchored in each of the four edges of said panel and projecting outwardly from said groove, said fastening means being evenly spaced about the perimeter of said panel, said fastening means on opposite edges being in alignment with each other, the spacing between the corners of said panel and the closest said fastening means being half that of the spacing between said fastening means along the intermediate portion of the said edges of the panel, whereby joints formed by adjoining panels can be staggered when in edge-to-edge relationship, said fastening means being in the form of clevises along two adjoining edges of the panel and in the form of eyes along the other two adjoining edges, the said eyes and clevises being substantially in the same plane as said wire mesh fabric and having apertures facing the major planes of the panel facings to facilitate entry of pins transversely of the said facings, the centers of the said apertures being substantially in registry with the center of the gap between two joined panels, whereby when two panels of the construction recited above, are placed in edge-to-edge relationship, an eye of one panel will align with a clevis of the adjoining panel so that a fastening pin-like element may be extended through them for joining together the fastening means of similar panels and thereby quickly, accurately, aligning and rigidly securing the panels, whereby allowing said panel and like panels to be erected without mortar during inclement weather and to be grouted later when weather conditions are suitable and whereby upon pouring of mortar grout in said grooves, said overlapping edges of said wire mesh fabric will serve to carry continuity of the reinforcing through the joints.

References Cited in the file of this patent

UNITED STATES PATENTS

| | | |
|---|---|---|
| 228,052 | Frost | May 25, 1880 |
| 468,990 | Rapp | Feb. 16, 1892 |
| 882,482 | Wilson | Mar. 17, 1908 |
| 1,014,416 | Schweikart | Jan. 9, 1912 |
| 1,045,519 | Conzelman | Nov. 26, 1912 |
| 1,086,177 | Hultquist | Feb. 3, 1914 |
| 1,237,542 | Morgal | Aug. 21, 1917 |
| 1,447,267 | Rurade | Mar. 6, 1923 |
| 1,553,157 | Henderson | Sept. 8, 1925 |
| 1,597,167 | Pace | Aug. 24, 1926 |
| 1,737,526 | Thompson | Nov. 26, 1929 |
| 1,863,734 | Venzie | June 21, 1932 |
| 2,044,101 | Reel | June 16, 1936 |
| 2,338,246 | Hoge | Jan. 4, 1944 |
| 2,431,104 | Bright | Nov. 18, 1947 |

FOREIGN PATENTS

| | | |
|---|---|---|
| 12,390 | Great Britain | of 1885 |
| 507,719 | Great Britain | of 1939 |
| 410,986 | Italy | of 1945 |